March 1, 1949.　　　R. R. GUNDERSON　　　2,463,172
TRACTOR-TRAILER POWER BRAKE SYSTEM
Filed Jan. 6, 1945　　　　　　　　　　　　2 Sheets-Sheet 1
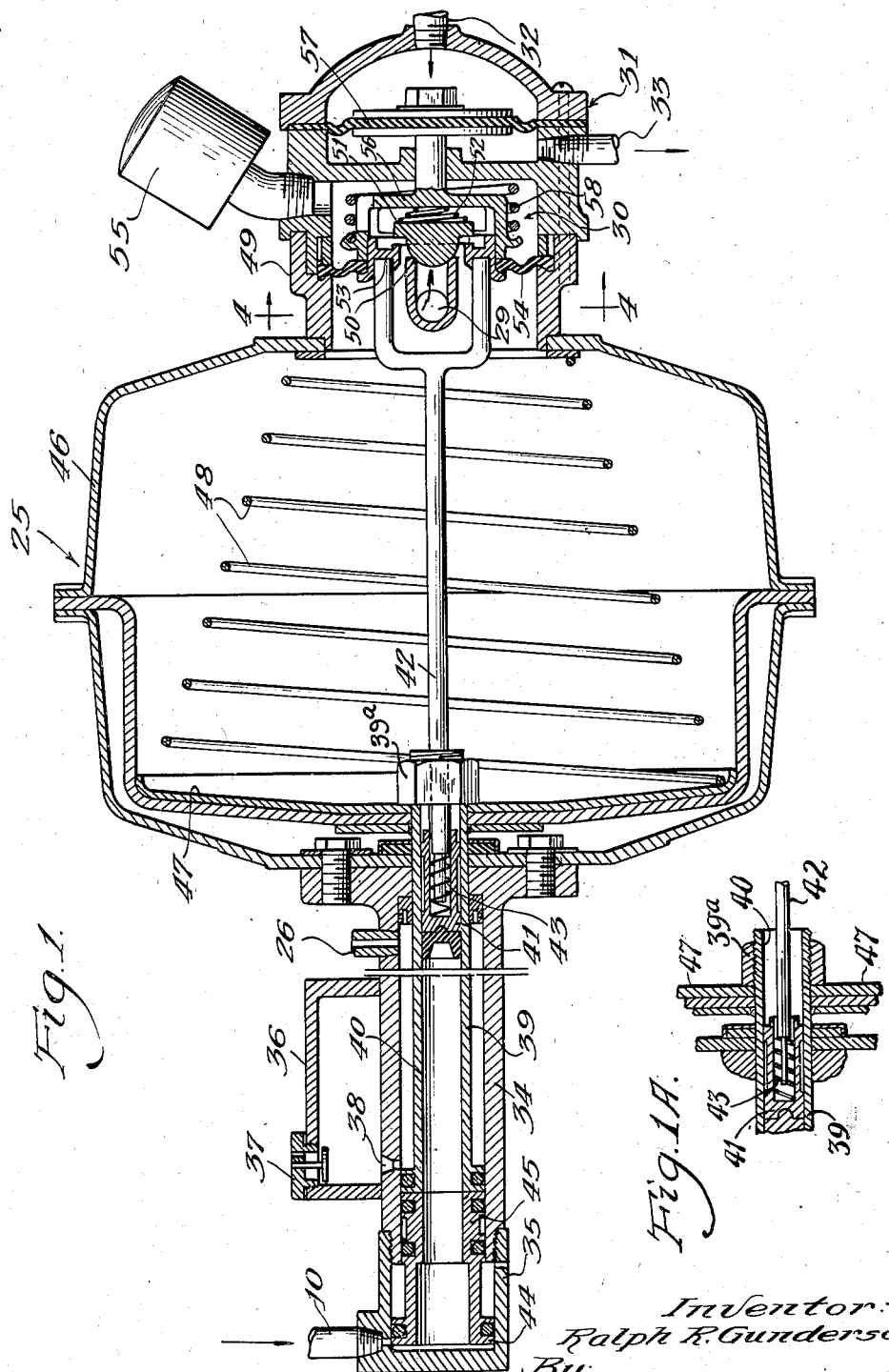
Inventor:
Ralph R. Gunderson
By:
Chritton, Wiles, Schroeder,
Merriam and Hofgren
Attorneys March 1, 1949. R. R. GUNDERSON 2,463,172
TRACTOR-TRAILER POWER BRAKE SYSTEM
Filed Jan. 6, 1945 2 Sheets-Sheet 2
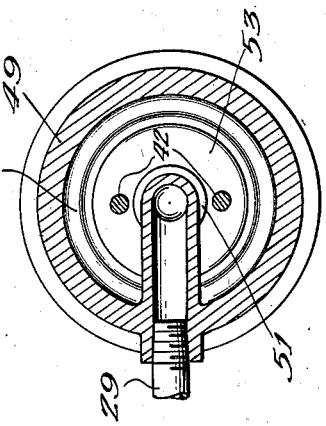
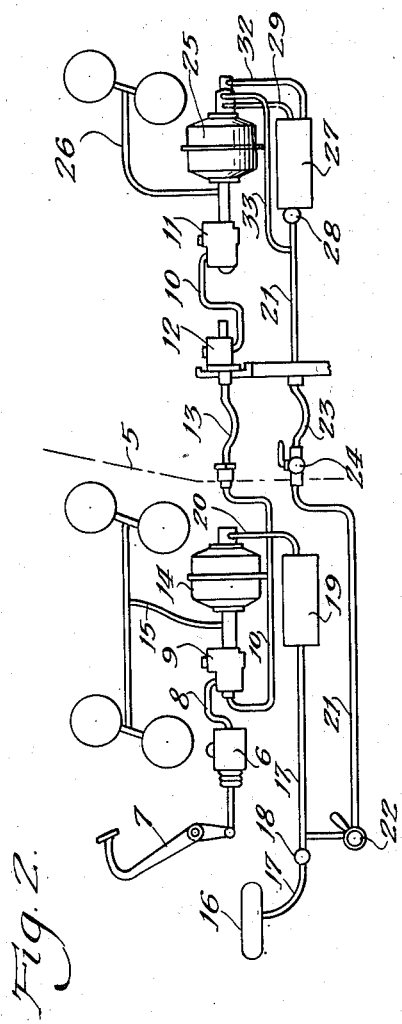
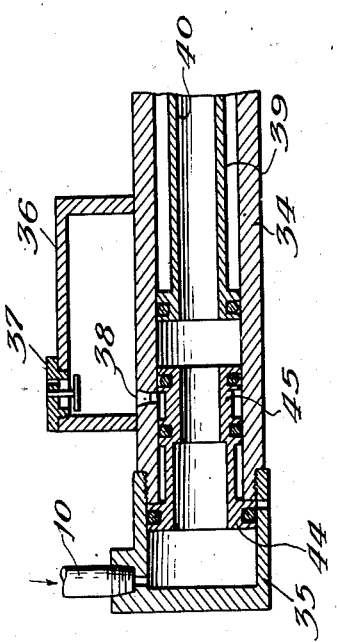
Inventor:
Ralph R. Gunderson
By: Chritton, Wiles, Schroeder, Merriam and Hofgren
Attorneys Patented Mar. 1, 1949

2,463,172

UNITED STATES PATENT OFFICE 2,463,172

TRACTOR-TRAILER POWER BRAKE SYSTEM

Ralph R. Gunderson, Chicago, Ill.

Application January 6, 1945, Serial No. 571,583

3 Claims. (Cl. 188—3)

This invention relates to hydraulic brake systems and more particularly to a system for operating the brakes of a motor truck and trailer.

The primary object of the invention is to provide an improved hydraulic brake system wherein only two hose connections are required between the tractor and the trailer, and in case of breakage of either of the hoses the brakes may be set on the trailer by pressure in the other hose.

Another object of the invention is to provide an improved power unit, including a suction motor booster, for the trailer brakes.

Another object of the invention is to provide an improved power unit, including a suction booster for the trailer brakes, wherein the valve to the booster will be controlled normally by the pressure from the pedal actuated master cylinder of the tractor, but in an emergency the same valve may be controlled by a hand valve on the tractor or automatically by a relay valve on the trailer.

Another object of the invention is to provide an improved operating cylinder for the trailer brakes wherein the pressure on the fluid coming from the master cylinder is increased.

Still another object of the invention is to provide a liquid reservoir for the operating cylinder on the trailer, which will enable air to escape from the cylinder when the brakes are released and cause liquid to fill the space left by the air. Of course, said reservoir will be automatically closed when pressure is applied to the operating cylinder.

The invention is illustrated in a preferred embodiment, in the accompanying drawings, in which—

Figure 1 is a longitudinal sectional view of the operating cylinder, suction booster motor and relay valve for a trailer; Fig. 1A, an enlarged fragmentary sectional view of the movable cylinder and piston; Fig. 2, a diagrammatic view of a brake system for a tractor and trailer; Fig. 3, a fragmentary sectional view of the operating cylinder shown in Fig. 2, but in the position where pressure is applied to the brake cylinders; and Fig. 4, a vertical sectional view taken as indicated at line 4—4 of Fig. 1.

One form of the improved brake system is illustrated diagrammatically in Fig. 2, wherein a broken section line 5 separates the tractor side at the left from the trailer side at the right. A master cylinder 6, actuated by a brake pedal 7, is adapted to force brake liquid through a conduit 8 to the truck operating cylinder 9, and by means of a communicating conduit 10 to a trailer operating cylinder 11. The trailer has a socket connection 12 for a coupling hose 13, which is shown in my application Serial No. 556,138, filed September 28, 1944, now Patent No. 2,393,679, issued January 29, 1946.

A suction booster motor 14 on the tractor assists the operating cylinder 9 in forcing liquid through the conduit 15 to the wheel brake cylinders of the tractor. An intake manifold 16 on the tractor may be the source of suction for both the tractor and trailer. A conduit 17, provided with a check valve 18, leads to a tractor suction reserve tank 19, which is connected to the booster motor by suction line 20. The suction motor 14 is shown and described in my Patent No. 2,406,328, issued August 27, 1946. A suction line 21 is connected to the suction line 17, through a manually operable valve 22, which may shut off the line 21 from the suction line 17 or admit air into said line 21. The line 21 connects up with the trailer through a detachable hose connection 23 provided with a shut off cock 24.

The operating cylinder 11 on the trailer is provided with a suction booster motor 25, which is a duplicate of the motor 14 and is shown in detail in Figure 1. A conduit 26 from the operating cylinder leads to the brake cylinders on the wheels of the trailer. A suction reserve tank 27 is provided on the trailer, and is connected to the main suction line 21 through a check valve 28. A suction conduit 29 leads from the suction tank to the booster motor, and is normally controlled by a valve 30, but is provided with an emergency relay member 31, which is connected at one side by a conduit 32 to the suction tank, and is connected on the other side to a conduit 33 to the main suction line 21.

Referring now to the power unit on the trailer, shown in Fig. 1, a main operating cylinder 34 is mounted on the trailer and is provided on its low pressure side with an auxiliary cylinder 35, of slightly larger diameter, which communicates with the master cylinder of the tractor by means of the conduit 10. A liquid reservoir tank 36 is provided on the top side of the cylinder 34, and has the usual filler cap 37. A port 38 connects the reservoir to the rear portion of the cylinder 34.

A hollow piston 39 is provided in the cylinder 34, and forms a small cylinder 40 for a piston 41, which actuates a push rod 42 by a yielding compression spring 43. A hollow multiple head piston 44 has one head in the auxiliary cylinder 35, and a smaller diameter head in the cylinder 34. The smaller piston head 45 is adapted to bear against the end of the piston 39 when the brakes are released, as shown in Figure 1. When pressure is applied from the master cylinder to the conduit 10, the parts will move to the position illustrated in Fig. 3, and the head 45 will succeed the head of the piston 39 in holding closed the port 38 to the reservoir.

The suction booster motor and valve is similar to that shown in my Patent No. 2,406,328, issued August 27, 1946, and has a metal casing 46 provided with a diaphragm 47, which is secured to the piston rod 39 by a nut 39a, and is urged forwardly by means of a conical spring 48. The booster motor valve is enclosed in a housing 49, and contains a seat 50 for a dome shaped valve member 51, which is adapted to close the suction line 29. The valve member 51 is urged to closed position by means of a conical spring 52.

The push rod 42 slides through the diaphragm 47, as shown in Fig. 1A, and has a bifurcated end which is connected to a ring member 53, carried by a flexible diaphragm 54 which has one side communicating with atmosphere through a filter vent 55, and the other side communicating with the interior of the motor casing 46. The ring member 53 is also connected to a spider-like member 56, which extends through the end of the housing 49, and is connected to the flexible diaphragm 57 of the relay member 31. A coil spring 58 urges the ring member 53 to the position shown in Figure 1, so that atmospheric pressure may enter through the member 55 and through the ring 53 to the inside of the motor casing. It will be understood that when the push rod 42, as viewed in Fig. 1, is moved to the right by pressure from the master cylinder through the conduit 10, it will cause the ring member 53 to engage the valve member 51 and shut off the communication with atmosphere. Further movement of the ring member 53 to the right will open communication between the conduit 29 and the interior of the motor housing, causing the suction pressure to draw the piston 39 to the right and force brake liquid through the conduit 26 to the wheel. This is the way the brakes are normally operated from the tractor by pressure on the foot pedal 7.

If movement of the pedal is stopped, atmospheric pressure on the diaphragm 54 will compress the spring 43 and shut off the suction line, and if the piston 39 is moving to the right under the influence of the booster, pressure will be reduced on the small piston 41 and will further facilitate the closing movement of the valve. As the operating cylinders of the tractor and of the trailer are each connected to the master cylinder, pedal pressure effects the simultaneous operation of both. This operation of a power cylinder is described in my Patent No. 2,406,328, issued August 27, 1946.

In the event that the main suction line 21 should be broken, or air admitted through the valve 22, pressure would be increased on the left of the diaphragm 57, as viewed in Fig. 1, through the conduit 33, and as suction would be exerted on the opposite side of the diaphragm 57 by the conduit 32 to the suction tank, the ring 53 would be moved to the right and the suction motor operated to set the brakes.

Thus it will be understood that breakage of the main suction line 21 would set the brakes on the trailer automatically, or, should the conduit 10 to the master cylinder be broken, the operator may set the brakes on the trailer by means of the valve 22.

The foregoing detailed description is given for clearness of understanding only, and no unnecessary limitations should be understood therefrom, for some modifications will be obvious to those skilled in the art.

I claim:

1. A hydraulic brake system for a tractor and trailer comprising: a pedal actuated master cylinder on a tractor; an operating cylinder on said tractor having one end connected to said master cylinder and the other end to wheel cylinders of the tractor; a piston in said operating cylinder; a suction booster motor connected to said piston and having a valve to a main suction line on the tractor, said valve being normally controlled by the pressure in the master cylinder; an operating cylinder on the trailer having one end making a fluid connection with the master cylinder on the tractor and the other end with wheel-cylinders on said trailer; a piston in said last mentioned cylinder; a suction-reserve tank on the trailer connected through a check valve to said main suction line of said tractor; a suction booster motor connected to the last mentioned piston and having a valve in a suction line from said reserve tank; means for actuating said last mentioned valve by the pressure in the master cylinder; and additional means for opening said valve upon loss of suction in the main suction line to the tank.

2. A hydraulic brake system for a tractor and trailer comprising: a pedal actuated master cylinder on a tractor for operating the brakes of said tractor; a cylinder on the trailer having one end making a fluid connection with said master cylinder of the tractor and the other end making a fluid connection with the wheel-cylinders of said trailer; a piston in said last mentioned cylinder; a suction booster motor connected to said piston; a suction reserve tank on said trailer connected to a main suction line on said tractor; a check valve between said tank and main suction line; a suction line from the reserve tank to said booster motor; a valve in the last mentioned suction line for controlling the booster motor; piston means for operating said valve by the pressure in the master cylinder; and an emergency relay member for operating said valve when the suction pressure fails in the main suction line to the tractor.

3. A hydraulic brake system for a trailer comprising: a cylinder adapted to be connected at one end to a pedal actuated master cylinder of a tractor and connected at its opposite end to wheel-cylinders of the trailer; a piston in said first mentioned cylinder; a suction booster motor connected to said piston; a suction reserve tank connected through a check valve to a main suction line on the tractor; a valve for connecting said booster motor with said suction reserve tank; normal means for actuating the booster valve including a small cylinder communicating with said master cylinder, a piston in said last mentioned cylinder having a push rod for actuating said booster valve, and a small flexible diaphragm connected to said push rod having one side communicating with atmosphere and the other side with said suction motor; and emergency means for actuating said booster valve including a relay member provided with a flexible diaphragm connected to the booster valve, one side of said diaphragm being connected to the main suction line of the tractor and the other side being connected to the suction reserve tank.

RALPH R. GUNDERSON.

REFERENCES CITED

The following references are of record in the file of this patent:

UNITED STATES PATENTS

| Number | Name | Date |
| --- | --- | --- |
| 2,215,732 | Bragg et al. | Sept. 24, 1940 |
| 2,305,638 | Rockwell | Dec. 22, 1942 |
| 2,359,687 | Stelzer | Oct. 3, 1944 |
| 2,361,419 | Schnell | Oct. 31, 1944 |